(12) United States Patent
Lacirignola et al.

(10) Patent No.: US 9,478,229 B2
(45) Date of Patent: Oct. 25, 2016

(54) METHODS AND APPARATUS FOR RECORDING IMPULSIVE SOUNDS

(71) Applicants: Joseph J. Lacirignola, Beverly, MA (US); Trina Rae Vian, Westford, MA (US); David F. Aubin, Jr., Pelham, NH (US); Thomas F. Quatieri, Newtonville, MA (US); Kate D. Fischl, Cambridge, MA (US); Paula P. Collins, Arlington, MA (US); Christopher J. Smalt, Arlington, MA (US); Paul D. Gatewood, Medford, MA (US); Nicolas Malyska, Watertown, MA (US); David C. Maurer, Stoneham, MA (US)

(72) Inventors: Joseph J. Lacirignola, Beverly, MA (US); Trina Rae Vian, Westford, MA (US); David F. Aubin, Jr., Pelham, NH (US); Thomas F. Quatieri, Newtonville, MA (US); Kate D. Fischl, Cambridge, MA (US); Paula P. Collins, Arlington, MA (US); Christopher J. Smalt, Arlington, MA (US); Paul D. Gatewood, Medford, MA (US); Nicolas Malyska, Watertown, MA (US); David C. Maurer, Stoneham, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 201 days.

(21) Appl. No.: 14/101,802

(22) Filed: Dec. 10, 2013

(65) Prior Publication Data

US 2015/0162047 A1    Jun. 11, 2015

(51) Int. Cl.
*H04R 3/00* (2006.01)
*G06F 3/16* (2006.01)
*G10L 21/0208* (2013.01)
*G11B 20/24* (2006.01)
*G11B 20/10* (2006.01)

(52) U.S. Cl.
CPC .......... *G10L 21/0208* (2013.01); *G11B 20/24* (2013.01); *G06F 3/165* (2013.01); *G11B 20/10* (2013.01); *H04R 3/005* (2013.01)

(58) Field of Classification Search
CPC ............ G01H 3/10; G01H 3/12; G01H 3/14; G08B 17/08; H03M 1/188; H04R 3/00; H04R 3/005; H04R 29/00; H04R 2410/05; H04R 2430/01; H04R 2499/11; Y10S 367/906
USPC ......... 73/645, 646, 647, 1.82; 341/139, 155; 367/124; 381/56, 72; 700/94
See application file for complete search history.

(56) References Cited

U.S. PATENT DOCUMENTS

| | | | |
|---|---|---|---|
| 3,802,535 A | 4/1974 | Peake et al. | |
| 4,985,925 A | 1/1991 | Langberg et al. | |
| H1726 H * | 5/1998 | Chen | G01S 7/2927 342/93 |
| 5,757,930 A | 5/1998 | Sidemann et al. | |
| 5,970,795 A | 10/1999 | Seidmann et al. | |
| 7,836,770 B2 | 11/2010 | Goldberg et al. | |
| 7,882,743 B2 | 2/2011 | Goldberg et al. | |
| 2004/0179697 A1 | 9/2004 | Griesinger | |
| 2006/0219015 A1* | 10/2006 | Kardous | G01H 3/06 73/645 |
| 2007/0058031 A1 | 3/2007 | Aizawa | |
| 2007/0180915 A1 | 8/2007 | Goldberg et al. | |
| 2007/0186656 A1 | 8/2007 | Goldberg et al. | |
| 2009/0316916 A1* | 12/2009 | Haila | H04R 3/005 381/57 |
| 2010/0119077 A1 | 5/2010 | Platz et al. | |
| 2010/0278350 A1 | 11/2010 | Rung | |
| 2011/0170117 A1 | 7/2011 | Fischer | |

FOREIGN PATENT DOCUMENTS

| | | | |
|---|---|---|---|
| CA | 2293522 A1 | 10/2000 | |
| CA | 2293522 C | 6/2003 | |
| CN | 101690256 A | 3/2010 | |
| CN | 102150439 A | 8/2011 | |
| EP | 2177043 A1 | 4/2010 | |
| EP | 2338287 A1 | 6/2011 | |

| | | | |
|---|---|---|---|
| EP | 2177043 B1 | 6/2012 | |
| EP | 2501153 A1 | 9/2012 | |
| GB | 2349466 A | 11/2000 | |
| GB | 2349466 B | 10/2003 | |
| JP | 7308847 A | 11/1995 | |
| JP | 2008212127 A | 9/2008 | |
| JP | 2008297001 A | 12/2008 | |
| JP | 2012502576 W | 1/2012 | |
| JP | 4936252 B2 | 5/2012 | |
| JP | 4960769 B2 | 6/2012 | |
| KR | 2011059639 A | 6/2011 | |
| SU | 580900 | 12/1977 | |
| WO | WO 2009/006897 A1 | 1/2009 | |
| WO | WO 2010/029509 A1 | 3/2010 | |

OTHER PUBLICATIONS

Kardous et al., "Noise Dosimeter for Monitoring Exposure to Impulse Noise" 2005, Applied Acoustics, vol. 66, No. 8, pp. 974-985.*
Notification of Transmittal of the International Search Report and the Written Opinion of the International Searching Authority in International Application No. PCT/US2014/69116, filed Dec. 8, 2014, mailed Aug. 13, 2015, 10 pages.
Basch, M.W., (1972) "A wearable pocket noise dosimeter", Conference Date: Apr. 18-27, 1972, Program of the 83rd meeting of the Acoustical Society of America. Abstracts only, p. 87.
Fowler, D.F., (1974) "Instrumentation for noise and vibration measurement (excerpts from Chapter 6, Handbook of Noise Measurement)", Conference Date: May 13-17, 1974, Proceedings of the Short Courses, Fundamentals of Noise Control and Reduction of Machinery Noise, pp. 124-139.
Kardous et al., (2005) "Noise dosimeter for monitoring exposure to impulse noise", Applied Acoustics, vol. 66, No. 8, pp. 974-985.
Kenna, L.C., (1981) "Impulse Noise Measurement Systems." Proceedings—1981 International Conference on Noise Control Engineering, Internoise 81: Practice of Noise Control Engineering, pp. 985-988.
Passchier-Vermeer et al., (1980) "Measurement of impulse noise at workplaces: relation between oscilloscopic measurements with an ordinary precision sound level meter", Conference Date: Aug. 25-27, 1980, Scandinavian Audiology Supplementum , No. 12 , pp. 85-97.
Price, G.R., (1981) "Assumptions in the measurement of impulse noise", Sound and Vibration , vol. 15 , No. 10 , pp. 8-9.
Price, G.R., (1981) "Implications of a critical level in the ear for assessment of noise hazard at high intensities", Journal of Acoustical Society of America,, vol. 69, pp. 171-177.
Johnson, D., (2000) "New Auditory Damage Risk Criteria and Standard for Impulse Noise", RTO HFM Lecture Series, pp. 2-1-2-9.
(2011) "Personal Sound Exposure Meter", Casella CEL Brochure.
(2010) "Etymotic takes the cost and complication our of noise dosimetry", Etymotic Research Inc., Information Sheet ER078105-C.
(2009) "Super-duty Noise Dosimeters", Spark Family of Noise Dosimeters, Larson Davis, A PCB Piezotronics Div., Information Sheet.
(Jun. 1996) "Preventing Occupational Hearing Loss—A Practical Guide", National Institute for Occupational Safety and Health, Publication No. 96-110.
(2009) "Noise Sentry", Data Sheet, pp. 1-4.
Price, G.R., (1981) "Assumptions in the measurement of impulse noise", Sound and Vibration, vol. 15, No. 10, pp. 8-9.
Price, G.R., (1981) "Implications of a critical level in the ear for assessment of noise hazard at high intensities", Journal of Acoustical Society of America vol. 69, pp. 171-177.
Singh, A.P.,(1973) "Wearable Noise Dosimeter", Noise Control Vibration Reduction, 4/6, pp. 250-254.
Stevin, G.O., (1980) "Integrating sound level meter for the measurement of continuous and impulse noise", Revue d'Acoustique, vol. 13, No. 55, pp. 241-244.
Von Gierke et al., (1980) "Daily Noise Exposure of Populations." 10th International Congress on Acoustics. vol. 3: Contributed Papers Continued.
Xiangfeng, L., (2006) "Application of sound analysis technique to monitor tool wear during the turning process", Conference Date: Nov. 9-11, 2006, ICPMT2006—Progress of Machining Technology—Proceedings of the 8th International Conference on Progress of Machining Technology (Abstract Only).
Li, Xiaoli, (2002) "A brief review: acoustic emission method for tool monitoring during turning", International Journal of Machine Tools & Manufacture 42, pp. 157-165.
Henderson, D., et al., (1986) "Impulse noise: critical review", Acoustical Society of America, vol. 80, No. 2, pp. 569-584.
(2013) "Advanced Personal Noise Monitoring", 3M Occupational Health & Environment Safety Division NoisePro Brochure.
Johnson, D., (2000) "New Auditory Damage Risk Criteria and Standard for Impulse Noise", RTO HFM Lecture Series, pp. 2-1—2-9.

* cited by examiner

*Primary Examiner* — Alexander Eljaiek
(74) *Attorney, Agent, or Firm* — Cooley LLP

(57) ABSTRACT

Loud sounds with fast rise times, like gunfire and explosions, can cause noise-induced hearing loss (NIHL). Unfortunately, current models do not adequately explain how impulsive sounds cause NIHL, which makes it difficult to predict and prevent NIHL on battlefields and other hostile or rugged environments. Fortunately, the impulsive sounds experienced by soldiers and others working in rugged environments can be recorded using a compact, portable system that acquires, digitizes, and stores high-bandwidth audio data. An example of this system can be mounted on a helmet or other article and used to record hours of audio data at a bandwidth of 20 kHz or higher, which is broad enough to capture sounds with rise times less than 50 ms. An analog-to-digital converter (ADC) digitizes these broadband audio signals at rate of 40 kHz or higher to preserve the impulse information. A processor transfers the digitized samples from a buffer to a memory card for later retrieval using an interrupt-driven processing technique.

34 Claims, 12 Drawing Sheets
(2 of 12 Drawing Sheet(s) Filed in Color)

METHODS AND APPARATUS FOR RECORDING IMPULSIVE SOUNDS

GOVERNMENT SUPPORT

This invention was made with government support under Contract No. FA8721-05-C-0002 awarded by the U.S. Air Force. The government has certain rights in the invention.

BACKGROUND

Noise-induced hearing loss (NIHL) is hearing loss caused by loud sounds. NIHL can be caused by a single exposure to an intense "impulse" sound, such as an explosion, or by repeated or continuous exposure to loud sounds over an extended period of time, such as noise generated in a woodworking shop. NIHL is not understood completely, but current models of NIHL suggest that sounds at levels above about 85 dB are likely to damage sensitive structures in the inner ear, leading to hearing loss. Current models of NIHL also suggest that extremely loud impulsive sounds (sounds with rise times shorter than about one second and peak amplitudes over about 85 dB) cause damage more quickly than softer sounds with longer rise times. Loud, impulsive sounds may also cause tinnitus, a condition in which the afflicted person perceives ringing in the ears even under silent conditions.

NIHL affects up to 15% of Americans between the ages of 20 and 69, or about 26 million people total. More than 30,000 cases of noise-induced hearing injuries were reported among active-duty soldiers, sailors, airmen, and Marines in 2010. The number of new tinnitus incidents per year increased 42% from 2007-2010 among service members. In 2009 alone, the government made more than 100,000 new service-connected disability awards for tinnitus and hearing loss. About 10% of veterans' disability payments made for tinnitus and hearing loss; in 2013, hearing loss and tinnitus disability payments totaled about $850,000,000 per year.

SUMMARY

Unfortunately, little is known about exposure to impulsive sounds, much less the noise-induced injury mechanisms associated with impulsive sounds. To address this dearth of information about injuries caused by impulsive sounds, the inventors have developed technology to provide audio recordings with broader bandwidths and larger peak amplitudes than conventional noise dosimeters. This technology can be implemented in a compact, portable package suitable for acquiring data continuously in rugged environments, including battlefields, for several hours at a time. The data collected by compact, portable audio recording systems can be used to more precisely estimate the sounds exposure experienced by the wearer and to create more precise models for predicting noise-induced hearing loss. This data can also be used to develop more advanced mitigation techniques, including active hearing protection.

Embodiments of the present invention include a portable system and corresponding methods for recording sound in an environment subject to impulse noise characterized by an initial rise time, which may be about 50 µs or less. Some examples of the portable system comprise a first microphone, a second microphone, a combining/summing node coupled to the first and second microphones, an analog-to-digital converter (ADC) coupled to the combining/summing node, and a processor coupled to the ADC. In operation, the first microphone, which may be worn on an article of clothing, a hat, a helmet, or a bag, produces a first analog signal representative of sound in a first amplitude range, and the second microphone produces a second analog signal representative of sound in a second amplitude range different than the first amplitude range (e.g., higher or lower than the first amplitude range). The combining/summing node combines the first analog signal and the second analog signal into a combined analog signal with a combined amplitude range that is about equal to the sum of the first amplitude range and the second amplitude range. The ADC samples the combined analog signal at a sampling rate (e.g., about 20 kHz to about 200 kHz) that is equal to or greater than twice the reciprocal of the initial rise time so as to produce a digital signal representative of the combined analog signal. And the processor stores a representation of the digital signal in a nonvolatile memory.

In some cases, the first amplitude range extends from about 115 dB to about 180 dB, the second amplitude range extends from about 75 dB to about 140 dB, and the combined amplitude range extends from about 75 dB to about 180 dB. The portable system may also include an attenuator that is operably coupled to an output of the first microphone and a first input of the combining/summing node in order to attenuate the first analog signal. And an amplifier that is operably coupled to an output of the second microphone and a second input of the combining/summing node in order to amplify the second analog signal.

In certain examples, the processor is configured to identify at least one portion of the digital signal corresponding to at least a portion of the impulse noise. The processor may also (i) divide the digital signal into a plurality of time-frequency bins, (ii) estimate an amount of energy in each time-frequency bin in the plurality of time-frequency bins to produce a plurality of energy estimates, and (iii) store the plurality of energy estimates in the nonvolatile memory as at least a portion of the representation of the digital signal. Such a processor may also select the distribution and/or sizes of the time-frequency bins so as to non-invertibly blur speech content information in the representation of the digital signal. It may also select the distribution and/or sizes of the time-frequency bins so as to substantially preserve spectral and intensity information of the combined analog signal in the representation of the digital signal.

The portable system may also include a first buffer that is operably coupled to the ADC. In operation, the first buffer stores at least one first sample of the analog signal generated by the ADC. In these examples, the processor may transfer the first sample from the first buffer to the nonvolatile memory and interrupt the transfer to store at least one second sample of the analog signal generated by the ADC in a second buffer operably coupled to the ADC. The processor may also interrupt the transfer based on acquisition of the second sample by the ADC or a signal from a timer.

The portable system may also include a power supply, which is coupled to ADC and the processor, to supply electrical power to the ADC and the processor. In some examples, the portable system also includes a housing disposed at least partially about the combining/summing node, the ADC, the processor, and/or the power supply. It may also include a communications interface, operably coupled to the processor, to transmit the representation of the digital signal to an electronic device.

Other embodiments of the present invention include a portable system for digitizing and recording an analog signal representative of at least one measurement of an environment. This portable system may include an ADC, a first buffer, and a processor. In operation, the ADC generates at least one first sample of the analog signal at a sample rate of about 20 kHz to about 200 kHz. The first buffer, which is operably coupled to the ADC, stores at least one first sample of the analog signal generated by the ADC. And the processor, which is operably coupled to the ADC and the first buffer, transfers the first sample from the first buffer to a nonvolatile memory so as to store a digital representation of the analog signal in the nonvolatile memory. The processor also interrupts the transfer to store at least one second sample of the analog signal generated by the ADC in a second buffer operably coupled to the ADC, e.g., in response to a signal from a timer or the ADC's acquisition of a second signal.

Some examples of this embodiment also include at least one microphone, operably coupled to the ADC, to provide the analog signal representative of the measurement of the environment. These examples may include an array of microphones to provide an analog signal comprising a plurality of audio tracks.

Yet another embodiment of the present invention includes a method of recording sound in an environment subject to impulse noise characterized by a rise time less than or equal to about 50 μs. This method involves producing, with a microphone, an analog signal representative of the impulse noise, the analog signal having a bandwidth of at least about 15 kHz and a peak amplitude of at least about 180 dB. An ADC generates a first sample of the analog signal at a sampling rate equal to or greater than 40 kHz. This first sample is stored in a buffer, then written from the buffer to a non-transitory memory in a period less than or equal to about 25 μs. And the ADC generates a second sample of the analog at the sampling rate.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Examples of the present technology include compact, portable systems suitable for recording broadband audio signals in rugged and hostile environments. In some cases, these systems may be small and light enough to be worn on headgear or clothing, yet store several hours of audio data acquired at bandwidths of about 10 kHz to about 100 kHz or more. The audio data collected by these systems can be used to measure a wide variety of different noise parameters, including parameters related to exposure to impulsive sounds (e.g., gunshots), for use in improving predictive modeling of potential noise-induced hearing injuries. For example, an exemplary system can be used to quantify a soldier's exposure to noise on the battlefield, a construction worker's exposure to noise at a construction site, or a factory worker's exposure to noise in a factory by recording real-time acoustic source characterization of background and impulsive sounds. Other applications include characterizing sound(s) associated with raceways (e.g., at motor sports events), spacecraft launches, pyrotechnics, logging operations, sawmills, lumberyards, demolition, construction, gun ranges, subways, trains, airplanes and airports, and emergencies (e.g., fires, shootings), etc.

The collected data can be used to develop a 'transfer function' that maps environmental noise dosimetry data to standard auditory damage models. The collected data can also be used to investigate sound propagation from the body to the tympanic membrane and to assess standard auditory damage models. Sound exposure information derived from the collected data can be used to modify noise-induced hearing injury models in order to improve the ability to predict auditory damage and design optimized mitigation strategies.

Figure 1A:
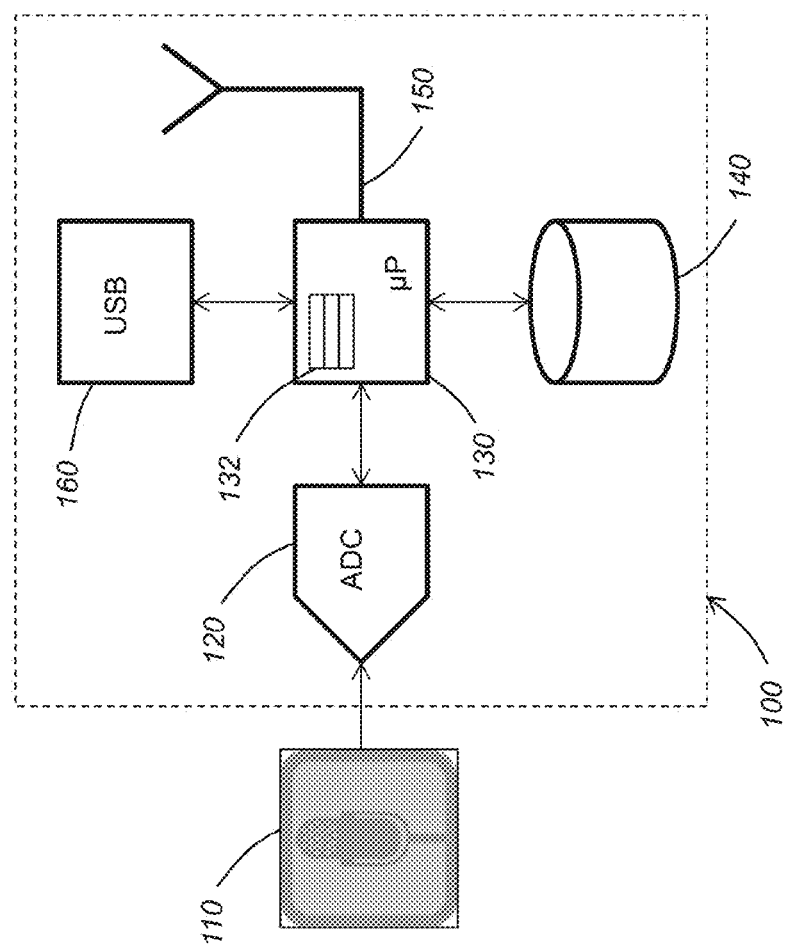
FIG. 1A is a block diagram of a compact, portable audio recording system suitable for recording high-impulse sounds with a single microphone.

FIGS. 1A-1D illustrate embodiments of a system 100 suitable for capturing, digitizing, and recording high-bandwidth audio signals with relatively large dynamic range. As shown in FIG. 1A, the system 100 includes an analog-to-digital converter (ADC) 120 coupled to a processor 130 (e.g., a microprocessor or microcontroller), which in turn is coupled to a nonvolatile (persistent, non-transitory) memory 140, such as a Secure Digital (SD) nonvolatile memory card or other suitable memory. In some cases, the system 100 may include one or more communications interfaces, such as an antenna 150 or a universal serial bus (USB) port 160. The system 100 may also include a power supply (not shown), such as a battery or solar cell, to power the ADC 120, processor 130, and any other electronic components.

Figure 1B:
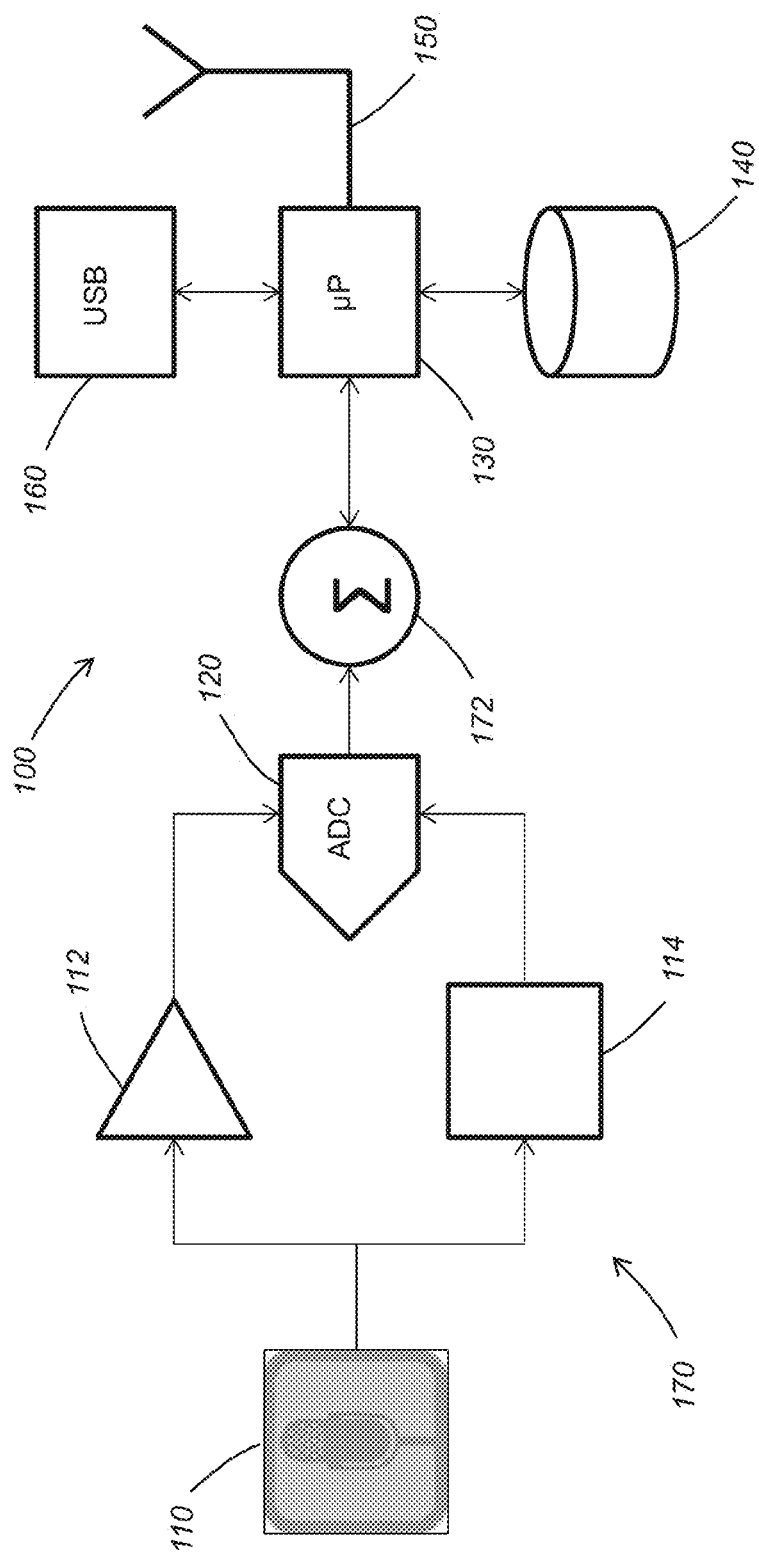
FIG. 1B is a block diagram of the compact, portable audio recording system of FIG. 1A with a single microphone using balanced detection for extended dynamic range.
Figure 1C:
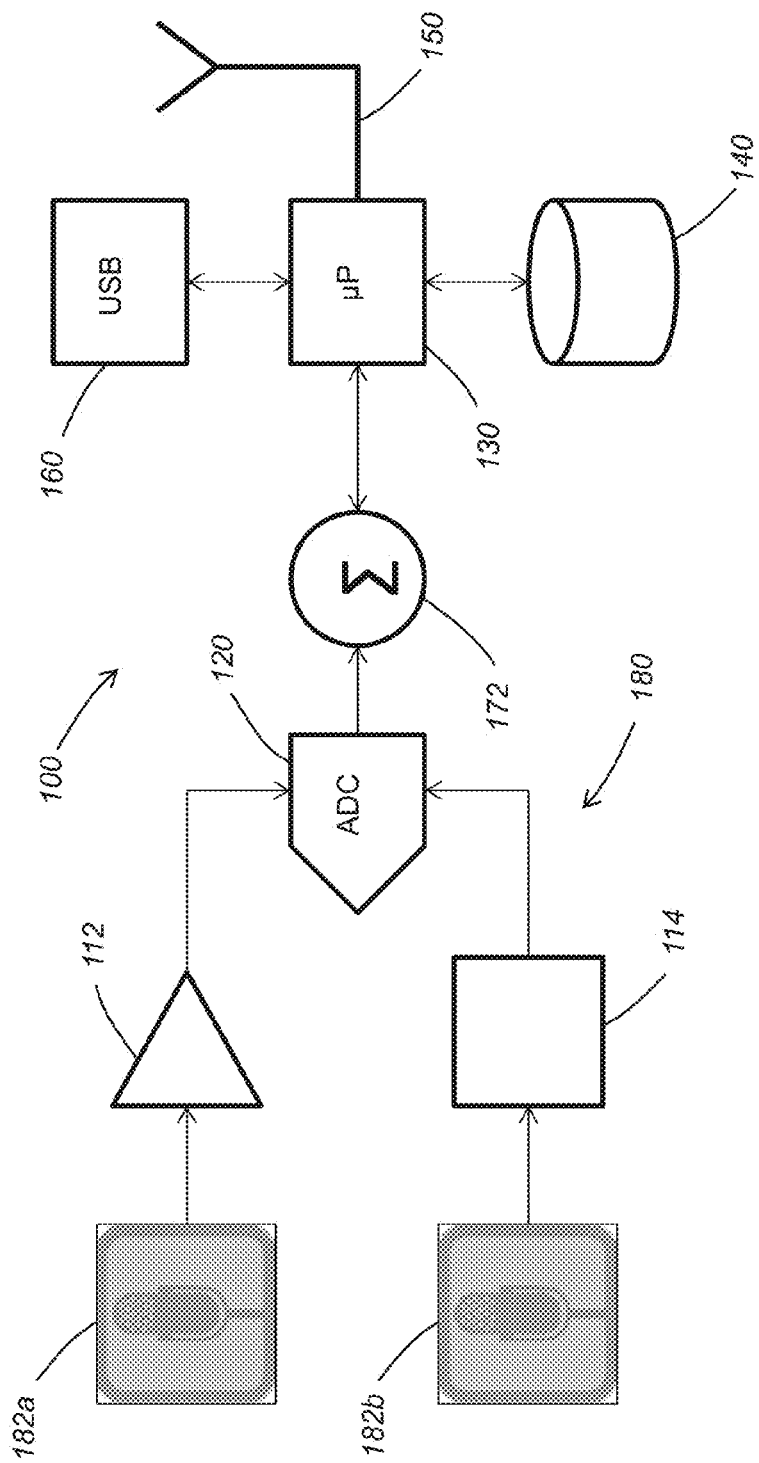
FIG. 1C is a block diagram of a compact, portable audio recording system of FIG. 1A with balanced stereo microphones.
Figure 1D:
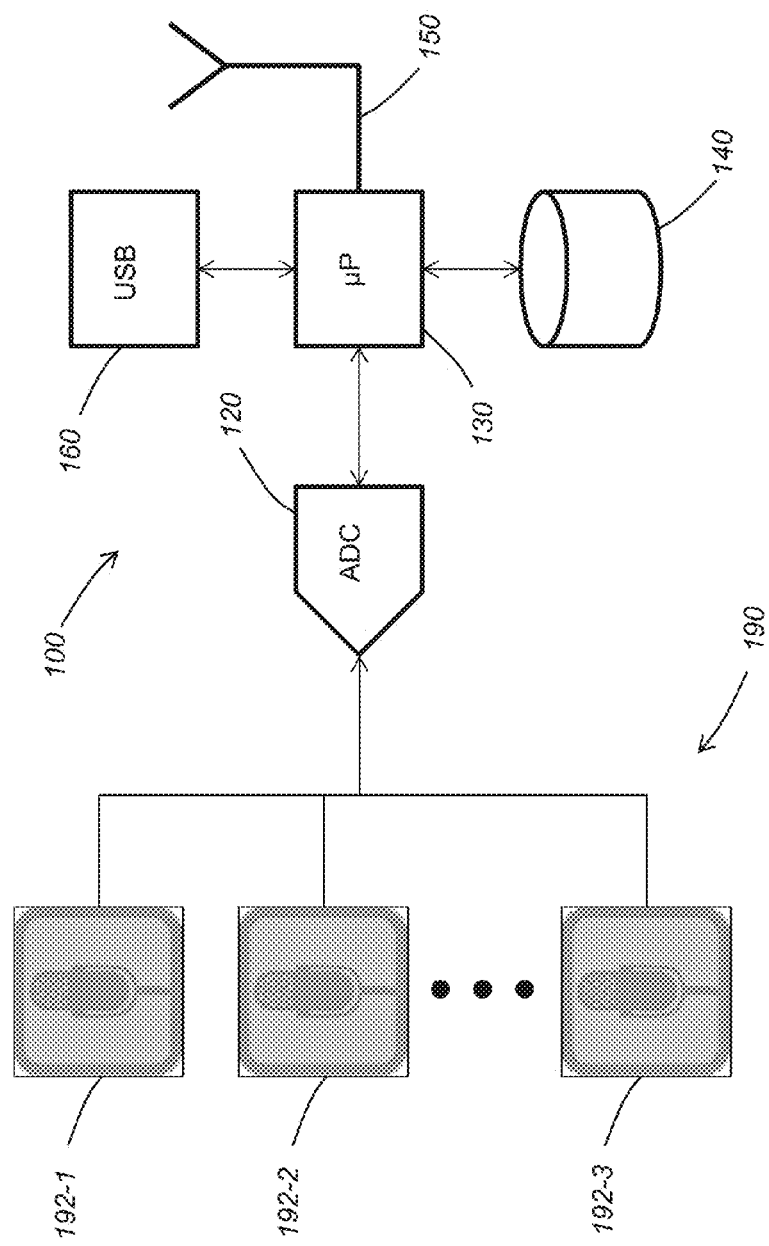
FIG. 1D is a block diagram of a compact, portable audio recording system of FIG. 1A with an array of microphones to provide an analog signal with multiple audio tracks.

In operation, the system 100 collects analog data with a microphone 110, which captures ambient audio signals at a bandwidth of about 1 Hz or to about 50 kHz (e.g., 5 kHz, 10 kHz, 15 kHz, 20 kHz, 25 kHz, 30 kHz, 35 kHz, or 40 kHz), peak sound pressure levels of 140 dB or higher (e.g., 150 dB, 160 dB, 170 dB, or 180 dB), and at amplitude ranges of about 20 dB to about 180 dB more (e.g., 80 dB, 90 dB, 100 dB, 110 dB, 120 dB, 130 dB, 140 dB, 150 dB, 160 dB, or 170 dB). The exact bandwidth and amplitude range of the microphone's output depends on the microphone 110 itself; different microphones may have different amplitude or frequency ranges. The system 100 can also collect audio from more than one microphone at a time, e.g., as shown in FIGS. 1C and 1D and described in greater detail below.

The ADC 120, which is coupled to the microphone's output, digitizes the analog signal from the microphone 110 at a sample rate that is equal to or greater than the Nyquist rate for the band of interest. In other words, the ADC 120 samples the analog signal at a sample rate equal or greater than twice the maximum frequency of interest in the analog signal. Exemplary ADCs may operate at sample rates of about 20 kHz to about 200 kHz (e.g., 50 kHz, 60 kHz, 70 kHz, 80 kHz, 90 kHz, 100 kHz) at 16 bits or at any other sampling rate and bit level suitable for preserving high-frequency audio information captured by the microphone 110. For instance, if the analog signal extends from DC (0 kHz) to 50 kHz, then the ADC 120 samples the analog signal at rate of 100 kHz or higher to preserve the information in the analog signal. (As understood by those of skill in the art, higher sampling rates may lead to better signal fidelity.) In other cases, the low-frequency cutoff may be higher than DC, and the analog signal provided by the microphone may be mixed down to baseband to reduce the sampling rate or to improve fidelity given a fixed sampling rate.

As the ADC 120 samples the analog signal from the microphone 110, it generates individual measurements, or samples, representative of the amplitude of the analog signal at respective instants in time. (Generally speaking, the higher the bit level and sampling rate of the ADC, the better the quality of the digital data.) The processor 130 stores these samples temporarily in one or more buffers 132 before transferring them to the nonvolatile memory 140. In some cases, the processor 130 may control the sampling and data transfer according to an interrupt-driven process as explained in greater detail below with respect to FIG. 3.

The nonvolatile memory 140 stores the recorded digital data for later retrieval and processing. In some embodiments, the nonvolatile memory 140 may include removable storage media, such as one or more industrial-grade micro SD cards (class 10/90-X), that can be wholly or partially removed from the system 100. Using a memory card or other removable storage medium to store the digitized data makes the system especially useful in rugged environments: the memory card can be swapped in the field, e.g., at regular intervals or when it is full, for a blank memory card enabling only limited interruptions in data collection. And in some cases, the system 100 may store data in the buffers or in another memory card while the full memory card is being replaced to prevent loss of data.

The system 100 may also transfer data stored in the nonvolatile memory to other electronic devices, including servers or other external computers, via the antenna 150. Depending on the application, the system 100 may be wirelessly connected to a communications network, such as the internet, cellular data communications network, or local area network, via the antenna 150 using any suitable communications standard. (The system may also include an amplifier, mixer, local oscillator, or any other component suitable for wirelessly transmitting or receiving digital data.) In some cases, the antenna 150 may broadcast information about the system 100 and the captured audio data. For instance, the processor 130 may compress and transmit the stored audio data in one or more brief transmission bursts at opportunistic or preprogrammed intervals. It may also transmit the digitized audio data in real-time in addition to or instead of storing it in the memory 140. In some cases, the antenna 150 is used to save power by selectively transmitting data when desired and having the electronics go into sleep mode when not transmitting data.

The antenna 150 can also be used to receive processing instructions, firmware updates for the processor 130, or data, such as position data from the Global Positioning System (GPS) or any other navigation system. For example, the processor 130 may store indications of the system's location derived from the position data in the memory 140 with the digitized audio information. If desired, this location information may be used in tagging or processing the stored audio information. The antenna 150 may also be used to reduce power consumption.

Alternatively, or in addition, the system 100 can transfer stored audio information to an external electronic device, such as a computing device connected to a computer network, via the USB port 160. The system 100 can also receive instructions, including processing instructions or updates for the processor 130, via the USB port 160. And in some examples, the USB port 160 can receive electrical power to power the system 100, to recharge the system's batteries (not shown), or both. Those of skill in the art will also readily appreciate that the system may include other ports (e.g., separate power ports) instead of or in addition to the USB port 160 shown in FIGS. 1A-1D.

Extending Dynamic Range and Capturing Sound Source Position Information

The system's amplitude range and frequency range depend in part upon the source of the analog data—in FIG. 1A, the microphone 110. As mentioned above, the ADC's sampling rate may be selected or controlled by the processor 130 to be greater than or equal to the Nyquist rate of the highest-frequency spectral component captured by the microphone 110. Similarly, the ADC's bit depth may be selected to match or exceed the microphone's dynamic range to preserve as much of the acquired audio information as possible during the digitization process.

In some cases, the system 100 may be coupled to analog signal processing components to extend the amplitude range covered by the analog input to the ADC 130. For instance, FIG. 1B shows a system 100 coupled to a single microphone 110 via an amplifier 112, an attenuator 114, and a summing/combining node 172. Depending on the embodiment, the summing/combining node 172 may be implemented as an analog summing circuit, a mux digital summation using software code, or any other suitable implementation.

In operation, the microphone 110 converts audio-frequency vibrations into an analog electrical signal, which is coupled in parallel to both the amplifier 112 and the attenuator 114. The amplifier 112 amplifies the analog signal, e.g., with a gain of 10 dB, effectively extending the lower edge of the system's amplitude range downwards. Similarly, the attenuator 114 attenuates the analog signal, e.g., with a loss of 10 dB, to extend the upper range of the system's amplitude range. The summing/combining node 172 combines the resulting amplified and attenuated digital signals into a single digital signal whose amplitude range is larger than the amplitude range of the raw analog signal generated by the microphone 110, e.g., by an amount up to the union of the range-(s) of each analog signal. In some cases, combining the analog signals may increases the signal-to-noise ratio by averaging noise common to both analog signals.

FIG. 1C illustrates how amplification and attenuation can be used with a stereo microphone system 180 to acquire, digitize, and record stereo audio data using the compact, portable audio recording system of FIGS. 1A and 1B. In this case, the stereo microphone system 180 includes at least two microphones 182a and 182b (collectively, stereo microphones 182) to detects sounds at different spatial positions. For instance, microphone 182a may be mounted to face left and microphone 182b may be mounted to face right or vice versa.

In some cases, each microphone 182a, 182b may detect sound over a different amplitude range. For instance, the first microphone 182a may produce a first analog signal representative of sound power levels extending from about 115 dB to about 180 dB and the second microphone 182b may produce a second analog signal representative of sound power levels extending from about 75 dB to about 140 dB. In operation, the summing/combining node 175 combines the first and second analog signals to form a combined analog signal whose amplitude range extends from about 75 dB to about 180 dB.

The system 100 can also be used to digitize, record, and process audio information captured by multiple microphones. In FIG. 1D, for example, the system 100 is coupled to a microphone array 190 that includes two or more microphones 192-1 through 192-n (collectively, microphones 192) coupled to the ADC 120. The microphones 192 may be distributed and mounted throughout a particular environment using any suitable mounting scheme. For instance, they may be distributed about the circumference of a hard-hat or helmet and wired to the ADC 120 (possibly via one or more other active or passive electronic components). They can also be distributed throughout a rugged environment (e.g., on different hard-hats or helmets, on different vehicles, etc.) and wirelessly coupled to the ADC 120 (e.g., via wireless links), with accelerometers, gyrometers, GPS receivers, or other navigational aids used to track their relative and/or absolute positions and orientations for processing and analysis.

Each microphone 192 in the microphone array 190 provides a separate audio signal, or track, that represents audio-frequency waves sensed by at the microphone's locations. These audio tracks may be combined (e.g., summed) to form a single analog signal that is sampled by the ADC 120 at a sampling rate equal to or greater than the Nyquist frequency of the highest-frequency spectral component. Alternatively, the ADC 120 may sample each audio track in a round-robin/interleaved fashion, e.g., first by sampling the analog signal from microphone 192-1, then by sampling the analog signal from 192-2, and so on. The system 100 may also include multiple ADCs (not shown), each of which is dedicated to one or more respective microphones 192 in the microphone array 190.

In certain embodiments, the processor 130 may use multi-track audio information acquired by the microphone array to estimate the relative location of the source of a particular sound or to identify different types of sounds. For instance, the processor 130 may use stereo or multi-track audio information to distinguish a blast or gunshot from a signal caused by dropping a microphone 192 on the ground. (Post-processing can also be used to identify sounds and their locations.) And if desired, the audio tracks from the may be amplified, attenuated, and/or delayed using the appropriate analog components placed in series with the microphones 192 in the microphone array 190 to extend the dynamic range, increase sensitivity, etc.

Rugged, Wearable Audio Recording Systems

Figure 2:
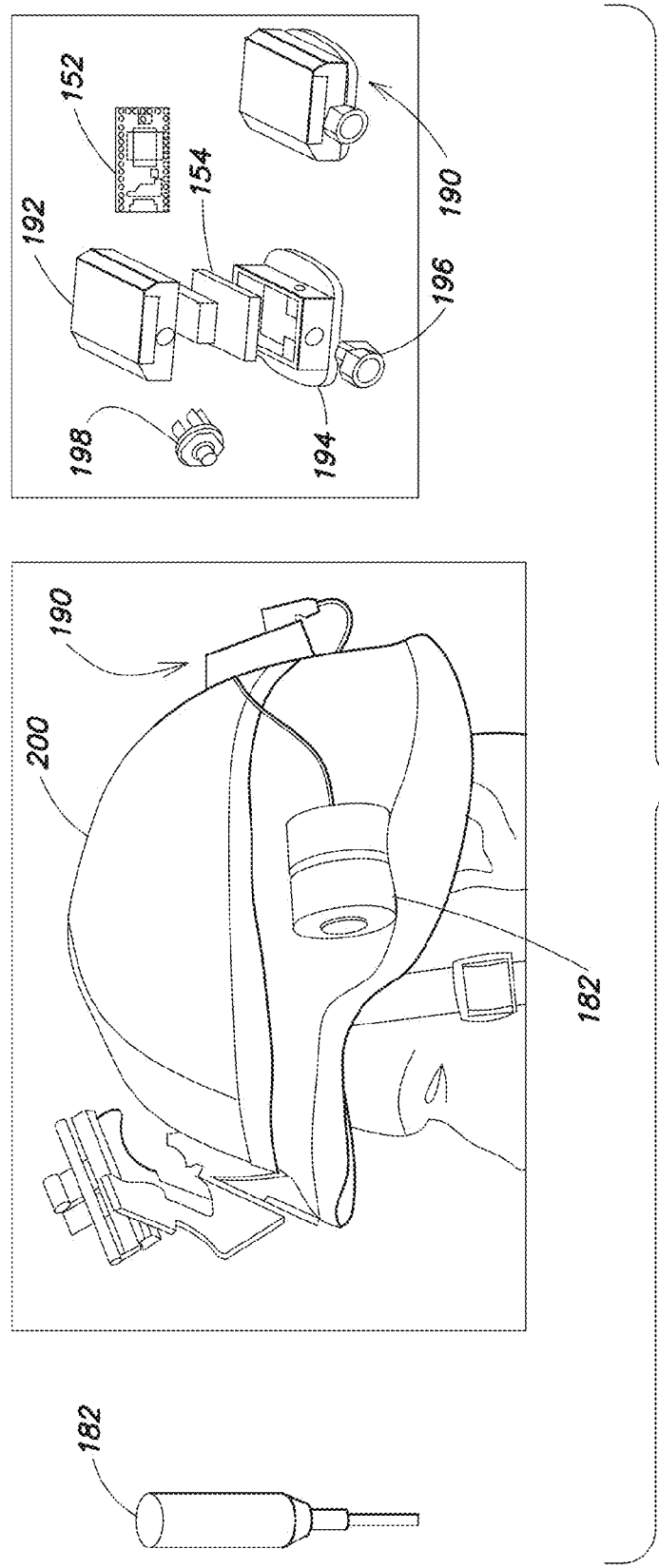
FIG. 2 illustrates a compact, portable audio recording system suitable for recording high-impulse sounds mounted in a housing and worn on a helmet.

FIG. 2 illustrates the compact, portable system 100 and stereo microphone system 180 of FIG. 1C mounted on the back of a helmet 200 for collecting audio data in a rugged environment (e.g., a battlefield). Stereo microphones 182 are mounted on the left and right sides of the helmet, close to the ears of the person wearing the helmet 200. Because the microphones 182 are mounted near the person's ears instead of elsewhere, they capture audio data that more accurately represents what the person actually hears while wearing the helmet 200.

The system 100 can be used to record ambient sounds with a peak amplitude of about 180 dB at a bandwidth of about 50 kHz. In one case, the system's amplitude range extends from about 81 dB to about 173 dB, for a total dynamic range of about 92 dB, with the stereo channels from each microphone 182 spanning about 58 dB each. The recorded digital data preserves the spectral characteristics of the ambient sounds and captures the rise time and spacing of impulsive sounds (e.g., gunshots and explosions) within earshot of the person wearing the helmet 200.

Depending on the battery life, memory size, and device temperature, the system 100 can record for up to 24 hours without imposing any unacceptable risks (e.g., of battery explosion) on the person wearing the helmet 200 or others near the helmet 200. For instance, the battery life and memory size may be long enough and large enough, respectively, to support eight hours or more of continuous 16-bit recording at a bandwidth of about 32 kHz. If desired, the system 100 may be reprogrammed or switched among operating modes to extend the collection period. In one mode, the system 100 may act as a noise dosimeter that records only the peak audio levels integrated across some or all of the audio band; in another mode, the system 100 may record high-resolution audio data.

As shown at right in FIG. 2, the system 100 is mounted in a housing 190 with a small, robust form factor. In the example shown in FIG. 2, the housing 190 has exterior dimensions of about 80 mm×55 mm×10 mm and is made of injection-molded plastic, resin, or any other suitable material. The housing 190 includes outer halves 192 and 194 that fit together to form an enclosed cavity, which holds a circuit board 152 with the electronic components (ADC 120, processor 130, etc.) shown in FIGS. 1A-1D and a battery 154, such as an NiMH or NiCad rechargeable battery, that powers the circuit board 152. Audio jacks 198 fit into apertures in the housing 190 and connect the components on the circuit board 152 to the microphones 182. When fully assembled, the system 100 (including the housing 190) weighs about 40 g or less, including the microphones.

A magnetic screw 196 or other actuator, such as a switch, turns the system 100 on or off. For example, tightening the magnetic screw 196 moves the magnet 196 in closer to a Hall effect sensor (not shown), which produces an output whose voltage changes in response to the increase in magnetic field strength. The processor, which is coupled to the Hall effect sensor, detects this change in voltage and starts the recording process. Loosening the magnetic screw 196 reduces the magnetic field sensed the by the Hall effect sensor, which produces another voltage change that causes the processor to stop recording audio data.

Those of skill in art will readily appreciate that an exemplary audio recording system could also be mounted in a housing with a different size, shape, or weight. The housing could also be made of a different material (e.g., stamped pieces of metal) or omitted altogether. For instance, the system components could be stitched into or onto an article of clothing, such as a jacket or shirt, or into or onto a bag, web gear, or any other suitable article with or without the microphones. The system could also be mounted on or in a portable device, vehicle (e.g., inside an aircraft cabin, racecar, construction vehicle, etc.), or in a particular location (e.g., a shop floor).

Interrupt-Driven Processing

As mentioned above, the system 100 shown in FIGS. 1A-1D and 2 can operate in interrupt-driven processing modes to improve sampling consistency, reduce power consumption, and reduce interference between writing data to memory and sampling the analog signal. In one mode, the system uses a timer, such as a software timer implemented in the processor, to interrupt data transfer from the buffer(s) to the nonvolatile memory during each sampling operation by the ADC. In another mode, the ADC interrupts the data transfer each time it generates a new sample. Depending on the implementation, the system can be hard-wired to operate in either the timer-driven interrupt mode or the ADC-driven interrupt mode or configured to switch between the two.

Figure 3:
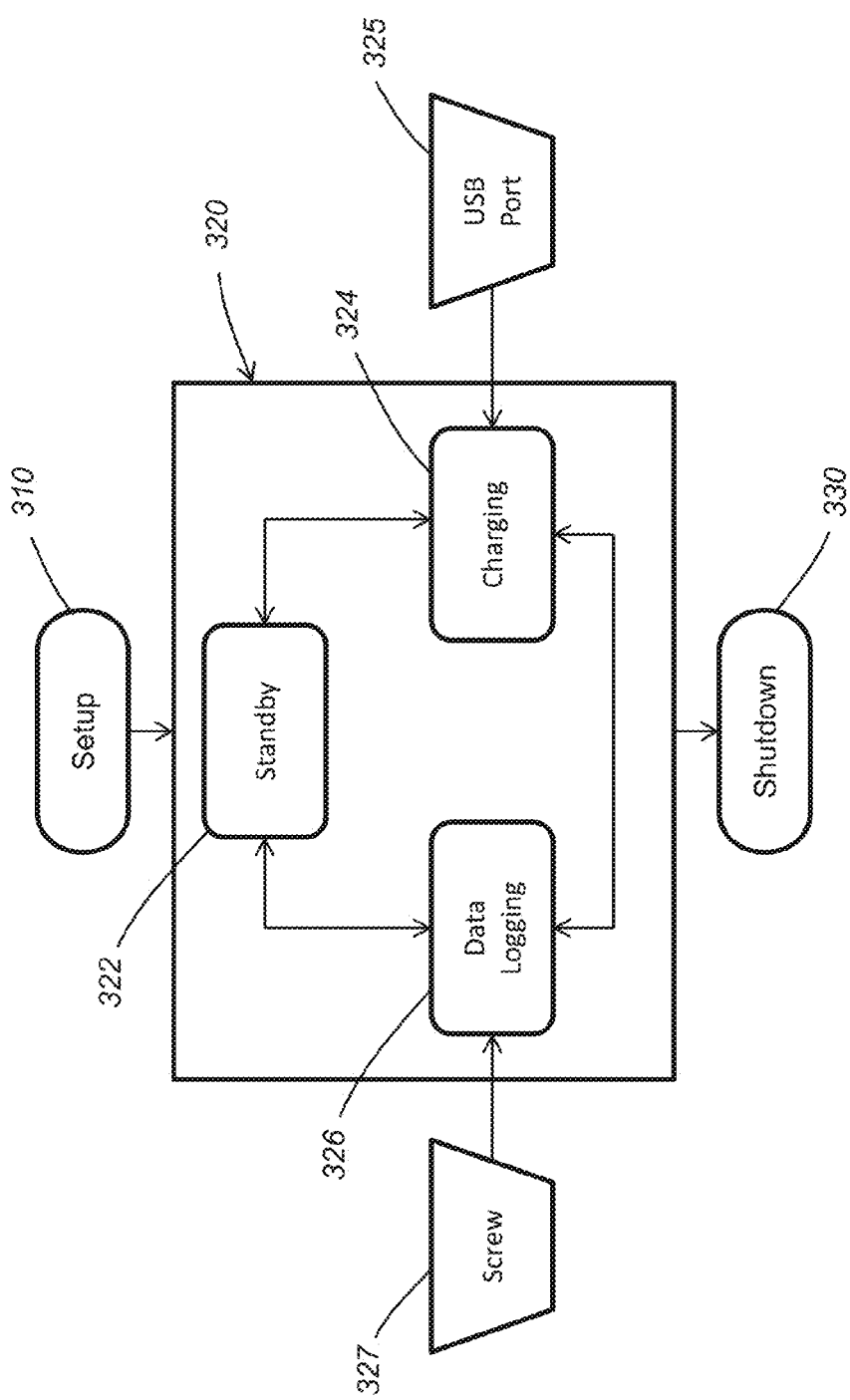
FIG. 3 is a flow diagram that illustrates interrupt-driven processing based on a timing signal employed by an exemplary compact, portable audio recording system.

FIG. 3 illustrates a process 300 with sub-processes and functions common to the timer-driven interrupt mode and the ADC-driven interrupt mode. In both interrupt modes, the system 100 executes a setup function 310, then a main loop 320 for logging data and performing other functions. The setup function 310 is executed once the device is powered on and may include assigning the input and output pins on the microprocessor, initializing the system's identification (ID) number (e.g., for using multiple devices), setting the analog-to-digital conversion resolution (e.g., to 16 bits), and creating a file in the nonvolatile memory to receive the digitized data from the buffer(s). In some examples, the ADC resolution can switched "on the fly" among different settings, e.g., to any bit level from about 8 bits to about 24 bits. For instance, switching to a higher resolution increases data fidelity, and switching to a lower resolution may increase battery life, decrease processing time, and make more conservative use of storage capacity.

Once setup 310 is complete, the system enters the main loop 320 and executes this main loop 320 repeatedly until the system is powered down (e.g., turned off by the user) as part of a shutdown function 330. In some implementations, the main loop 320 includes a large case/switch statement in which the system switches among different states in response to various user actions, like plugging the device into a computer or screwing in the magnetic screw. These states include a standby state 322, a charging state 324, and a data logging state 326. The processor may call different functions in each state, depending on user input, remaining battery charge, environmental conditions, etc.

In the standby state 322, the system waits to be connected to a computer to download data and/or charge, or for a user input 327 that causes recording to begin, such as screwing in the magnetic screw 196 shown in FIG. 2. While in the standby state 322, the processor may call functions that check for a USB connection or other connection to an external computer, for the battery voltage level (e.g., with respect to a "turn-off" threshold), and for user input 327 that (e.g., as indicated by a changed in voltage from a Hall effect sensor that senses the position of a magnetic screw).

The system enters the charging state 324 when it is connected to a computer or other electronic device, e.g., by plugging a cable into its USB port 325. Once the system is connected to the computer, it switches into a "reader mode" in which the contents of the nonvolatile memory (e.g., an SD card) can be accessed from the computer. Once in this mode, the system calls the appropriate functions to monitor the charging of the battery. The system stops charging if the battery temperature increases above a threshold temperature (e.g., set to prevent battery failure), the battery voltage reaches a voltage threshold, or the battery has been charging for more than a predetermined period (e.g., a few hours). These failsafe measures may prevent the battery from charging incorrectly or exploding.

In the charging state 324, the processor may call functions that return the battery temperature (e.g., in degrees Celsius or Fahrenheit), calculate the battery voltage, and return the battery voltage. Other functions, typically used in debugging, may print the battery's voltage, temperature, or both. The processor may also call functions that initialize internal variables to monitor battery charging and that monitor the battery's voltage and temperature during charging. And the processor may check for the USB connection.

In addition, the processor can turn off and on the power to the nonvolatile memory (SD card) in the charging state 324. This enables the system to switch from a mode in which the processor can log data to the nonvolatile memory to another mode in which the nonvolatile memory can be viewed from the computer as a data drive. This function is called once the device has been connected to the computer via a USB port or other connection. Another function enables the nonvolatile memory to be viewed from the computer as a data drive. The processor may execute yet another function in which the nonvolatile memory is "ejected" from the computer, allowing the processor to access the nonvolatile memory for writing purposes.

Actuating the device, e.g., by throwing a switch or screwing a magnetic screw (step 327), causes the system to enter the data logging state 326. In response, the processor reads the system's configuration file and selects the appropriate data acquisition mode, e.g., full-resolution audio acquisition mode or low-resolution dosimeter mode. Once the processor has selected the data acquisition mode, it executes a data logging function in which it writes the data from buffers that are full to the nonvolatile memory.

Generally, the period taken the write data from a given buffer to the nonvolatile memory is less than the sampling period (the reciprocal of the sampling rate). In some cases, the buffer size is chosen to match the page size of the nonvolatile memory to reduce the amount of time required to write the data from the buffer to the nonvolatile memory. For example, the buffer size may be about 512 bytes, which matches the page size of certain SD cards. Because the buffer size matches the SD card's page size, the processor can write the data to the SD card in contiguous chunks (e.g., one page at a time), which tends to be faster than splitting the data into fragments and writing the fragments to non-contiguous portions of the SD card.

The processor continues to loop, checking to see if any buffers are full, until the magnetic screw is unplugged, the battery dies, or another signal stops execution of the data logging function 326. Unscrewing the magnetic screw or throwing the switch again causes the system to enter the standby state 322, and connecting the system to a computer may cause the system to enter the charging state 324. Upon exiting the data logging state 326, the processor closes any files open in the nonvolatile memory and returns to the main loop 320 to change states.

If the processor senses that the battery voltage is about to fall below a certain threshold voltage (e.g., 3.3 V) or the battery dies, the device stops recording and shuts down (shutdown state 330). In some cases, this threshold voltage may equal to or greater than the voltage needed to write to the nonvolatile memory. The system may remain in the shutdown state 330 until power is disconnected and reconnected.

In data sampling and logging with timer- and ADC-based interrupts, the processor executes a data logging loop in which it checks to see whether or not it has filled the buffers with data generated by the ADC. If a particular buffer is full, the processor writes the data from that buffer to the nonvolatile memory, leaving some buffer space free to hold samples collected by the ADC during the data transfer from the buffer to the nonvolatile memory. If no buffer is full, then processor waits before checking the buffer status again until the user switches the system to standby mode or charging mode, the battery dies, or the processor receives an interrupt signal from a timer or the ADC.

To interrupt the data logging process using a timer interrupt, the processor maintains a timer that counts clock ticks from a clock running at a clock rate (e.g., 48 MHz) faster than the ADC's sampling rate (e.g., 35 kHz). The clock drives the ADC by effectively setting the sampling rate to a fraction of the clock rate: when the timer reaches a predetermined threshold, the processor initiates an ADC sample collection. It also interrupts the data logging process and resets the timer, e.g., immediately after the timer overflows. Once sample collection is complete, the processor resumes the data logging process by storing the sample in a buffer and returns to the interrupted buffer checking or data writing step. When the timer overflows again, the processor initiates the next ADC sample collection, interrupts data logging, resets the timer, etc. The frequency of the timer interrupt (and hence the sampling rate) may be varied by changing the clock rate or timer threshold. For instance, the ADC sampling rate may be relatively low (e.g., about 1 Hz) for collecting low-resolution noise dosimetry data and relatively high (e.g., about 100 kHz) for collecting high-resolution audio data.

The ADC-driven interrupt approach uses sample collection rather than an external clock to trigger interruption of the data logging process. In this approach, the clock initiates a first ADC callback to start sampling. After the first callback, the ADC asynchronously initiates an interrupt after collection of each sample. In other words, the ADC samples the analog signal at the sample rate and interrupts the data transfer from the buffer(s) to the nonvolatile memory when it generates a sample. After the processor writes the sample to a buffer, the data transfer process resumes as in the timer-driven approach. Hooks in the code handle anomalies associated with the nonvolatile memory, e.g., such as when shifting from a USB reader to internal writing. Another hook detects whether or not the user has switched the system out of data logging mode, e.g., by checking for a magnet close enough to trigger the Hall effect sensor (on/off sensor) described above with respect to FIG. 2. Depending on the implementation, the ADC-driven interrupt approach can support higher sampling rates than the timer-driven interrupt approach. In addition, an external ADC suitable for supporting the ADC-driven interrupt approach may consume less power than a microprocessor used to maintain a software timer for the timer-driven interrupt approach.

Impulsive Sound Measurements

Figure 4A:
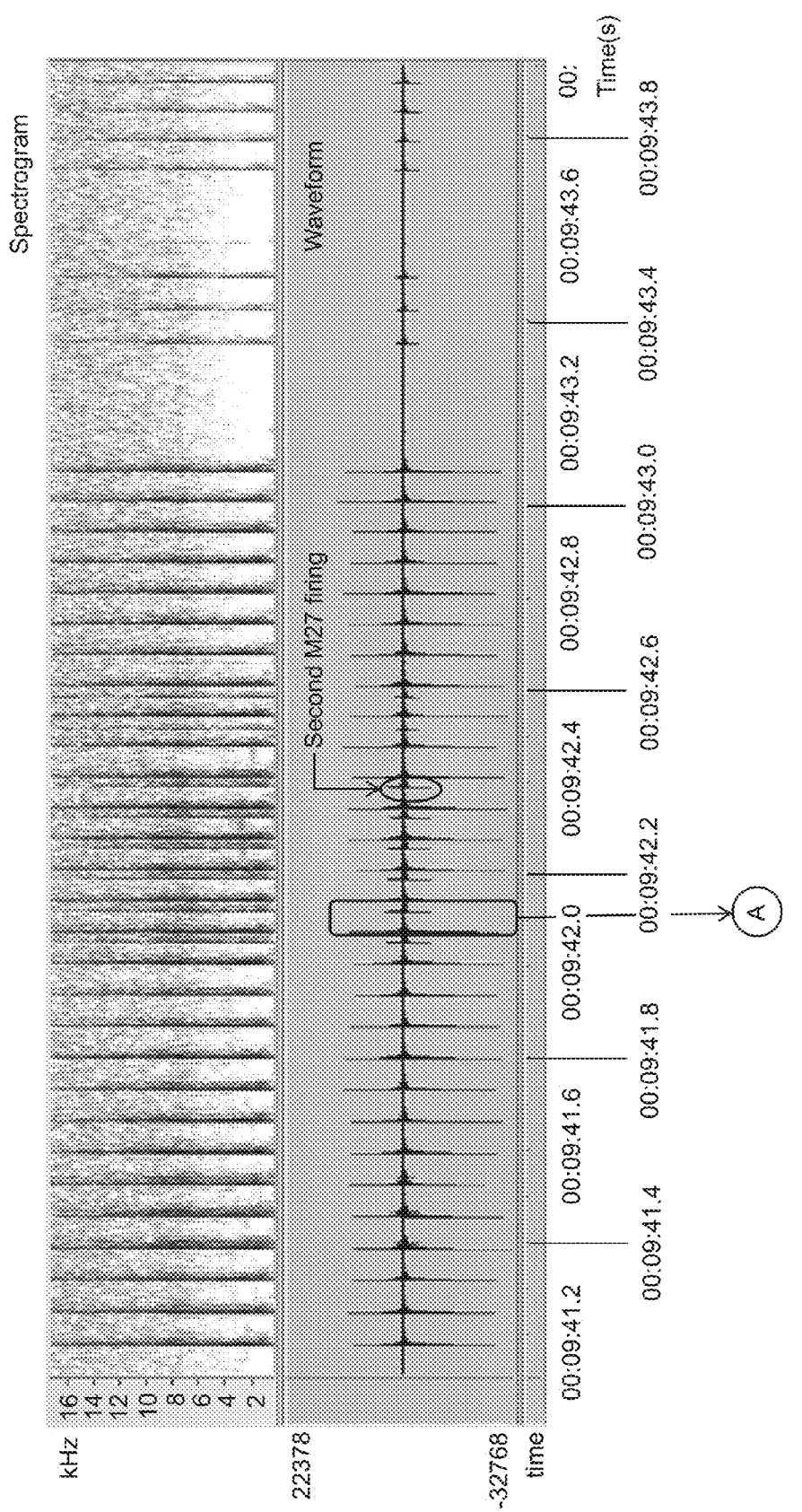
FIG. 4A shows a spectrogram (upper panel) and a plot of amplitude versus time (lower panel) for a recording of automatic rifle fire captured using an exemplary high-bandwidth audio recording system
Figure 4B:
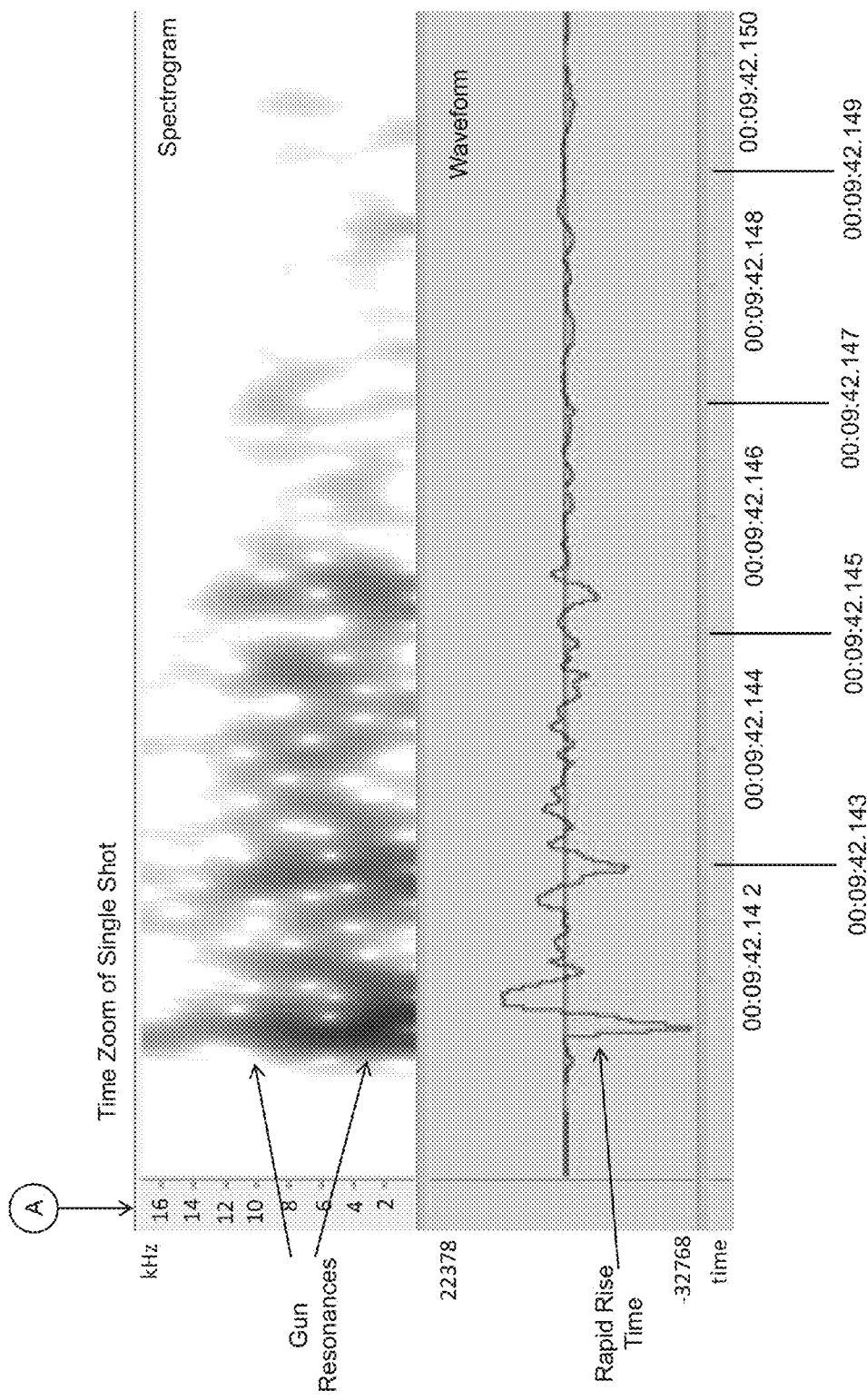
FIG. 4B shows a close-up, corresponding to a single gunshot, of the spectrogram (upper panel) and plot (lower) shown in FIG. 4A.

FIG. 4A shows a spectrogram (top) and a plot of sound amplitude versus time (bottom) of gunshots from two M27 Infantry Automatic Rifles firing at 14 rounds per second captured by an exemplary audio recording system. FIG. 4B shows close-ups of the spectrogram (top) and waveform (bottom) shown in FIG. 4A; these close-ups correspond to a single gunshot. To capture the gunshots, the system acquired sound with a pair of balanced microphones like those shown in FIG. 1C over a bandwidth of about 17 kHz and digitized the resulting analog signal at a sampling rate of about 34 kHz kHz. The "low-channel" microphone acquired sound pressure levels of about 80-140 dB, and the high-channel microphone acquired sound pressure levels spanning about 110-170 dB.

The spectrogram and the plot in FIG. 4A both show large peaks associated with gunshots from the first M27 interleaved with intermittent smaller peaks form a second M27 that is farther from the microphone. The maximum recorded sound pressure level is about 148 dB. The spectrogram shown in FIG. 4B shows the power spectral density associated with a single gunshot. And the plot in FIG. 4B shows that rise time of the resulting digital signal is less than 60 μs.

Speech Content Removal Processing

If desired, the processor can irreversibly blur or scramble at least a portion of the acquired audio data without removing spectral or temporal information associated with the impulsive sounds. In other words, the processor can permanently remove information in one or more sub-bands of the acquired audio data without substantially affecting the ability to measure the temporal, spectral, and amplitude characteristics of impulsive sounds. For instance, the processor may remove speech content from the digital data stored in the nonvolatile memory, e.g., to minimize operational security risks on battlefields and other hostile environments, to preserve confidential information, or to meet non-disclosure obligations. This processing effectively "washes" out the phonetic and thus syllabic structure of speech, while retaining much of the temporal and spectral information used for noise induced hearing loss (NIHL) modeling, including impulsive-like sounds (e.g., gun shots and explosions) and steady and repetitive background sounds (e.g., vehicle and machine noises). Speech content and information in other sub-bands can also be removed during post-processing after the data is transferred from the nonvolatile memory to another computer or computing device.

Figure 5:
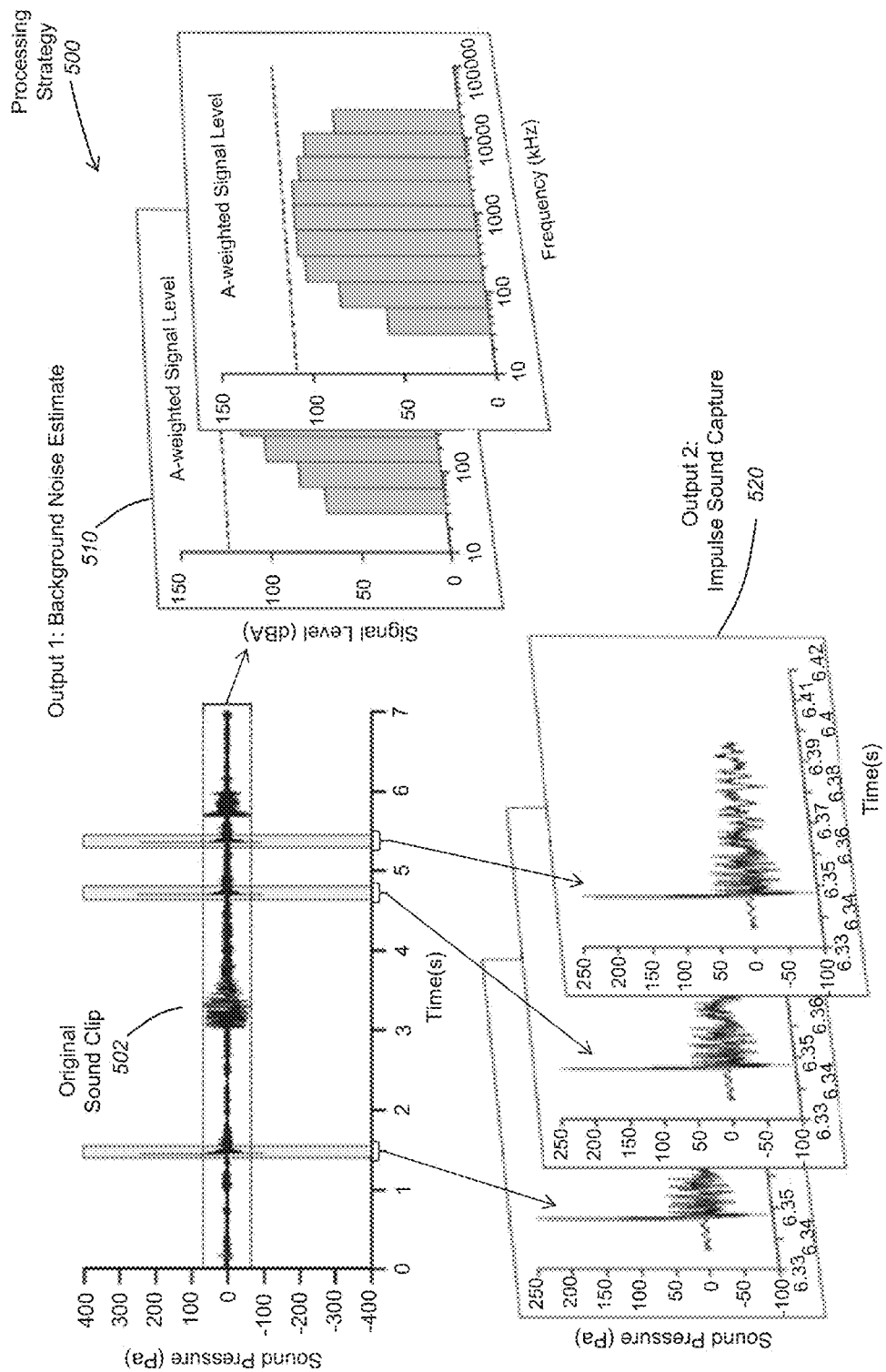
FIG. 5 illustrates signal processing for removing speech or other information while preserving impulse information from the signal captured by a high-bandwidth audio recording system.

FIG. 5 illustrates a processing strategy 500 suitable for removing speech content or other information from a digitized audio sample while preserving background noise levels and impulsive sounds. The system's processor (not shown) splits an original sound clip 50, which may be stored as one or more digital samples in either the system's buffer or the nonvolatile memory, into two outputs: a first output 510 that represents a background noise estimate, and a second output 520 that represents recorded impulse sounds. If desired, these outputs may be recorded directly on the nonvolatile memory to prevent the system from recording speech content (or other information) in the nonvolatile memory.

To generate the first output 510, the processor calculates the energy in 32 logarithmically spaced frequency bands. This energy is sampled over a time interval of 200 ms, resulting in a downsampling of both time and frequency. This process of calculating the spectral energy distribution and temporal downsampling is roughly analogous to the blurring out of a person or face on television. In addition, the process of generating the first output 510 is lossy, the first output 510 cannot be inverted to recover speech content.

The first output 510 can be generated using other frequency spacings, including logarithmic spacings, linear spacings, octave spacings, and fractional octave spacings, and other sampling intervals. Depending on how many frequency bands used and the time-averaging window, however, it may be possible to reconstruct a comprehensible estimate of the original speech waveform. But selecting downsampling parameters for the "blurring" process using perceptual and objective measures results in a first output 510 with enough spectral and intensity information to inform a noise-induced hearing loss model, but not enough to understand speech in a reconstructed signal.

The processor generates the second output 520 by filtering out samples whose amplitude falls below a particular amplitude threshold and/or whose duration exceeds a particular duration threshold. Depending on the application, the amplitude and duration thresholds may be chosen to capture impulsive noise events. To remove speech content but not gunshots, for example, the processor filters out samples corresponding to sound pressure levels below about 125 dB, which is louder than the loudest sound produced by a single human voice, and durations longer than about 40-70 ms. Because a single human voice cannot produce sound this loud, the second output 520 does not include conversational human speech. Rather, it includes very loud impulsive sounds, such as weapons fire, blasts, etc. Like the first output 510, the second output 520 is generated via a lossy process and does not include any recoverable speech content.

Even if a single sample in the second output 520 includes both speech and very loud impulsive sounds, it may be difficult to separate and recover the speech for at least two reasons. First, capture of the waveform would be only about 40-70 ms long, which is half the duration of a typical speech sound (less than the length of a single word). Second, because an impulsive sound such as gunfire is so much louder than speech (even shouting), the signal-to-noise ratio of the recording devices would likely prohibit hearing or separating the much softer speech from the gunfire.

Those of skill in the art will readily appreciate that processing strategy 500 illustrated in FIG. 5 can be used to remove other information instead of (or in addition to) speech content. For example, the second output could be generated by removing very loud impulsive sounds (e.g., sounds with amplitudes over 125 dB and durations of less than about 70 ms). Similarly, the frequency and time bins selected to generate the first output 510 may be selected to blur low-frequency mechanical sounds without unduly affecting speech content.

Figures 6A, 6B:
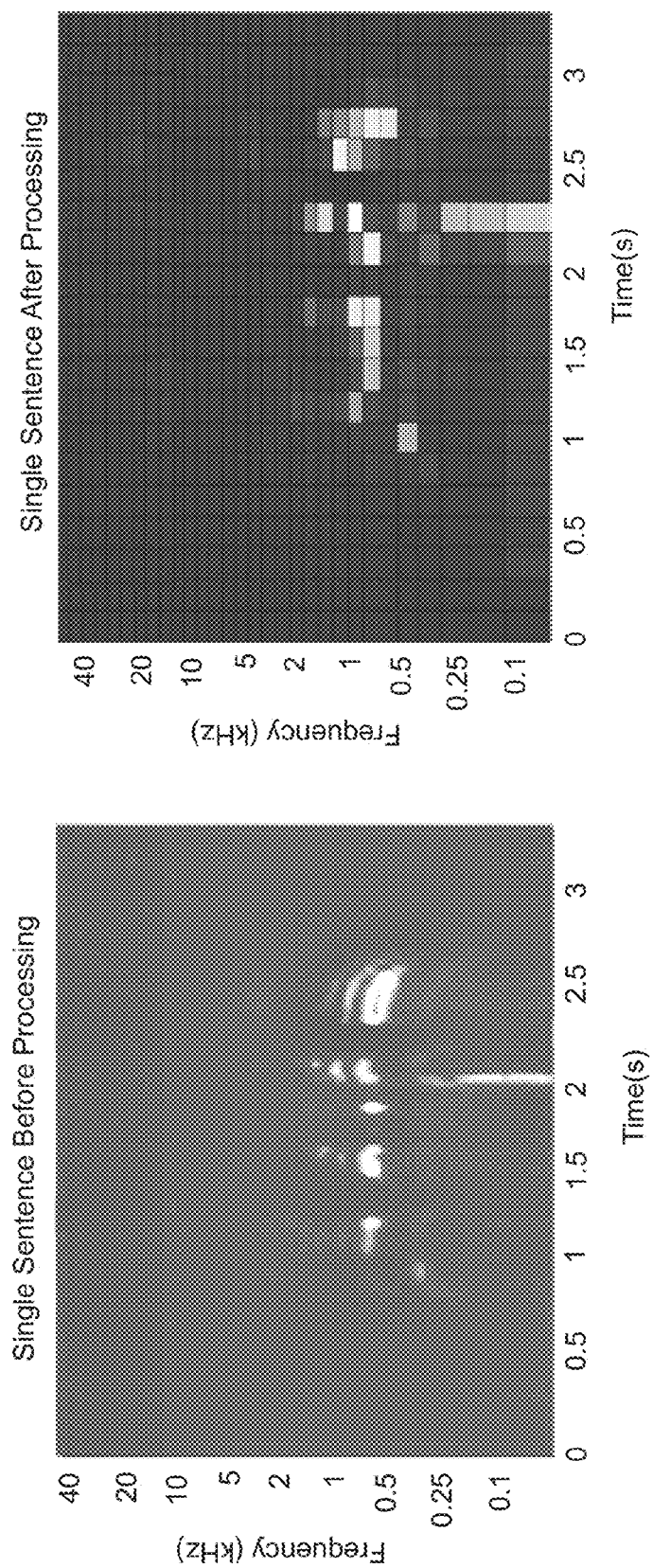
FIG. 6A is a spectrogram of a single sentence recorded by a high-bandwidth audio recording system.
FIG. 6B is a spectrogram of the single sentence displayed in FIG. 6A after speech removal according to the process illustrated in FIG. 5.

FIGS. 6A and 6B show spectrograms of single spoken sentence before and after processing, respectively. Both spectrograms show the temporal evolution of spectral energy of the processed signal, where red indicates higher energy and blue less energy. And the pixelation in FIG. 6B shows that processing permanently removes speech content information from the signal.

The performance of the processing strategy 500 shown in FIG. 5 was tested with a perceptual pilot test to identify words and sentences after the speech removal process. The test material included recordings of five phonetically and syllabically balanced spoken sentences with a quiet background, and recordings of five similar spoken sentences with electronically added weapons fire. These recordings were processed using the processing strategy illustrated in FIG. 5 before being interpreted by four test participants, three of whom were experts in speech and acoustic analysis. The test participants were permitted to listen to each sentence as many times as desired and instructed to write down any words they perceived.

Although the test participants were able to guess at the words in each processed recording, they indicated that they had very little to no confidence in their answers. Overall, the participants identified about 1% of the key words in the quiet environment and about 0% of the words with weapons fire. (The participants' ability to identity about 1% of the words in the quiet recordings does not mean that the speech was comprehensible because the words in the selected sentences are commonly used and it is possible to guess correctly.) These results demonstrate that even someone with extensive knowledge of sound and speech would be unlikely to interpret speech in a file processed using the speech removal algorithm.

Figure 7A:
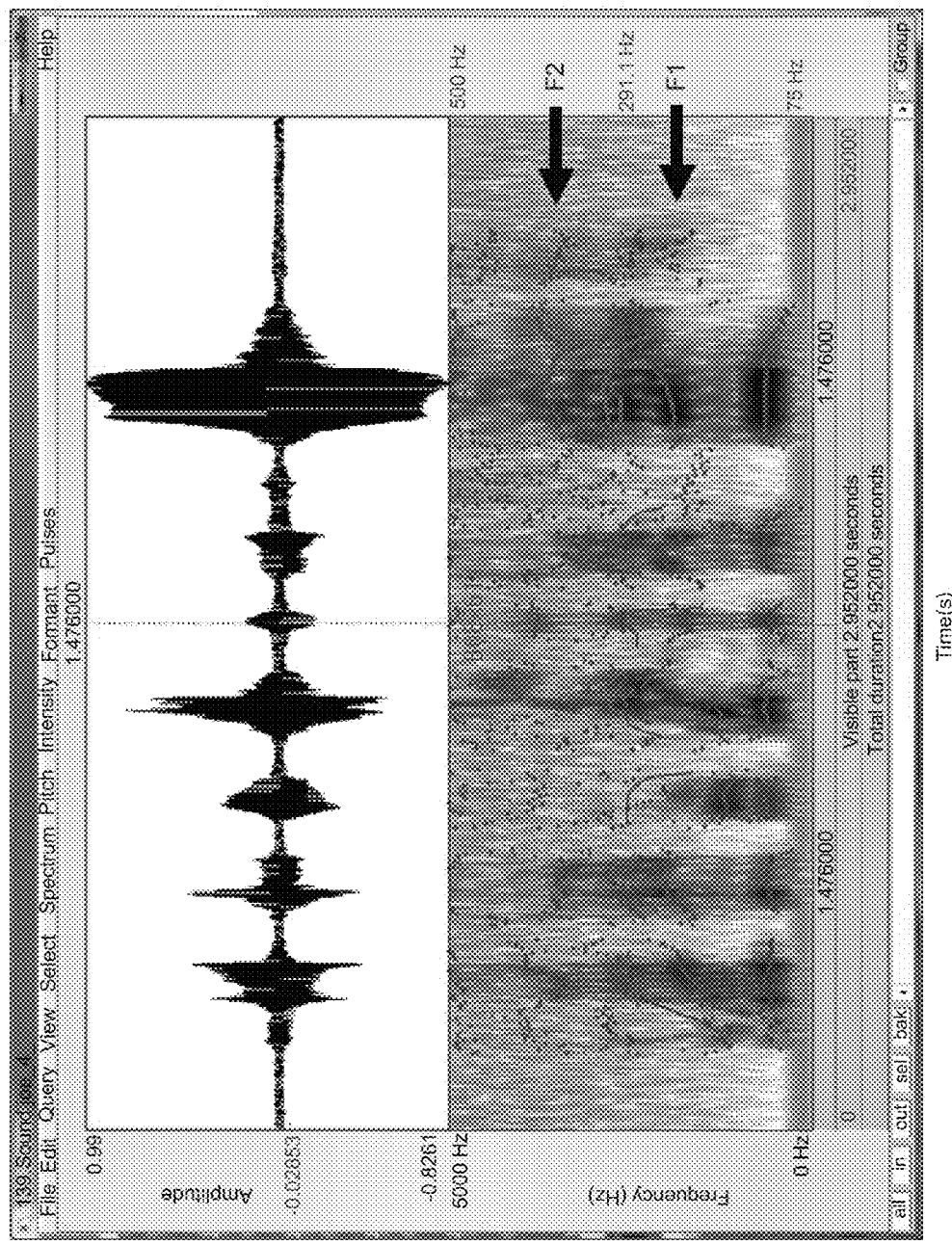
FIG. 7A shows a plot of an original speech waveform (top panel) and a spectrogram (bottom panel) with formant tracks (red lines) and a pitch track (blue lines) recorded by a high-bandwidth audio recording system.
Figure 7B:
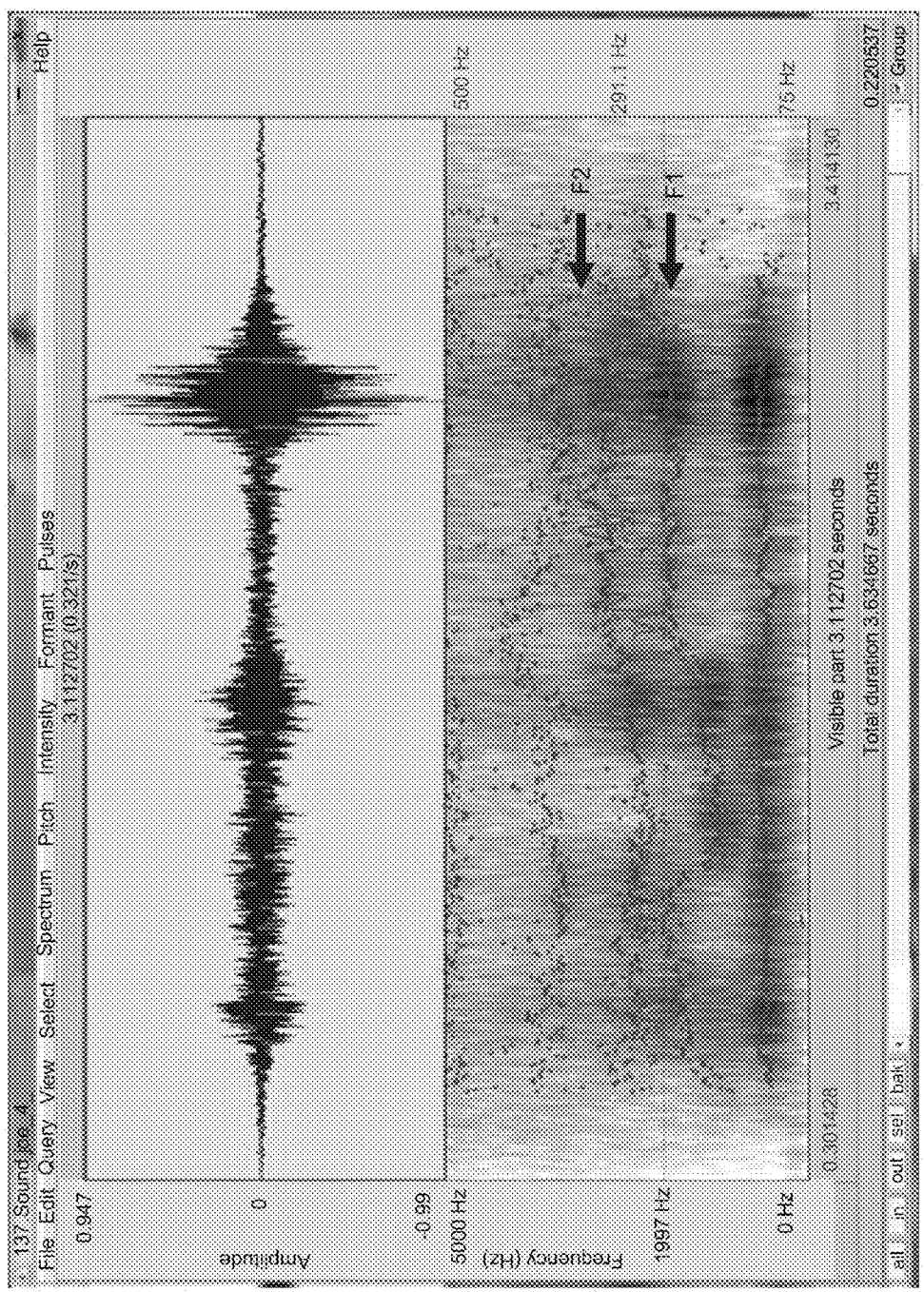
FIG. 7B is a plot of a re-synthesized speech waveform (top panel) and a spectrogram (bottom panel) with formant tracks (red lines) and a pitch track (blue lines) generated from the speech waveform depicted in FIG. 7A.

FIGS. 7A and 7B illustrate an analysis of processed speech that quantifies the ability to segregate vowels automatically (e.g., using a computer). FIG. 7A shows the temporal waveform (upper plot) and spectrogram (lower plot) associated with an unprocessed speech signal. FIG. 7B shows the temporal waveform (upper plot) and spectrogram (lower plot) of the same speech signal after the processing described above. Both spectrograms include red lines indicating vocal tract resonances (referred to as formants in the speech community) F1 and F2 and blue lines indicating pitch tracks estimated using a phonetic analysis software tool (e.g., Praat).

FIGS. 7A and 7B shows that if vocal tract resonant structure is not present in the speech signal, then recognition by computer (or human) may not be possible. This is because the lack of vocal tract resonant structure implies a removal of phonetic and thus syllabic structure of speech. Comparing FIGS. 7A and 7B shows that the original speech signal (FIG. 7A) contains dynamic formants F1 and F2 that vary during the voiced (vowel) segments of the speech (indicated by darker horizontal bands in the spectrogram). The time variations are required in phonetic and syllabic identity. The processed speech in FIG. 7B, on the other hand, shows very noisy and inaccurate estimates of the formants, which barely vary for the different vowels across the sentence.

Using a database of 540 English vowels over 45 speakers gives more insight into how processing removes formant information. In the unprocessed speech, the different groupings are somewhat separated by their F1 and F2 formants, and are therefore fairly distinguishable from one another, which is not necessarily the case in the processed speech. This helps to explain why the test participants had trouble identifying words in the perceptual test. Using a k-means clustering algorithm to classify each vowel in the database resulted in a 56% classification rate in the unprocessed speech, while only 19% after processing. This decrease in clustering accuracy is a direct result of the information lost permanently by the processing scheme, and gives a relative metric of how much formant information is lost.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A portable system for continuously recording sound pressure due to both continuous noise and impulse noise in an environment, the portable system comprising:
    a first microphone to produce a first analog signal representative of impulse noise sound pressure in a first amplitude range from about 100 dB to about 180 dB;
    a second microphone to produce a second analog signal representative of continuous noise sound pressure in a second amplitude range from about 20 dB to about 140 dB, the second amplitude range being different from the first amplitude range;
    at least one analog-to-digital converter (ADC), operably coupled to the first microphone and the second microphone, to sample:
        the first analog signal at a first sampling rate equal to or greater than twice the reciprocal of a minimum impulse noise rise time in the first analog signal, thereby generating a first digital signal; and
        the second analog signal at a second sampling rate equal to or greater than twice the reciprocal of a minimum impulse noise rise time in the second analog signal, thereby generating a second digital signal;
    a combining node, operably coupled to the at least one ADC, to combine the first digital signal and the second digital signal into a combined digital signal having a combined amplitude range, the combined amplitude range being larger than the first amplitude range, larger than the second amplitude range, and less than or about equal to the sum of the first amplitude range and the second amplitude range, the combined digital signal representing both the continuous noise and the impulse noise in the environment; and
    a processor, operably coupled to the combining node, to store a representation of the combined digital signal in a nonvolatile memory.

2. The portable system of claim 1, wherein:
    the first amplitude range is from about 115 dB to about 180 dB;
    the second amplitude range is from about 75 dB to about 140 dB; and
    the combined amplitude range is less than about 105 dB.

3. The portable system of claim 1, further comprising:
    an attenuator, operably coupled to an output of the first microphone and a first input of the at least one ADC, to attenuate the first analog signal; and
    an amplifier, operably coupled to an output of the second microphone and a second input of the at least one ADC, to amplify the second analog signal.

4. The portable system of claim 1, wherein the sampling rate is about 20 kHz to about 200 kHz.

5. The portable system of claim 1, wherein the processor is configured to identify at least one output representing at least one type of noise from the combined digital signal.

6. The portable system of claim 1, wherein the processor is configured to:
    (i) divide the combined digital signal into a plurality of time-frequency bins;

(ii) estimate an amount of energy in each time-frequency bin in the plurality of time-frequency bins to produce a plurality of energy estimates; and (iii) store the plurality of energy estimates in the nonvolatile memory as a first output representing at least continuous background noise from the combined digital signal.

7. The portable system of claim 6, wherein the plurality of time-frequency bins are selected using a frequency spacing, the frequency spacing being at least one of logarithmic, linear, octave, and fractional octave.

8. The portable system of claim 6, wherein the plurality of time-frequency bins are selected using a time interval of about 200 ms.

9. The portable system of claim 1, wherein the processor is configured to:

(i) remove from the combined digital signal any samples having an amplitude less than a particular amplitude threshold and any samples having a duration exceeding a particular duration threshold; and (ii) store the remaining samples from the combined digital signal in the nonvolatile memory as a second output representing at least impulse noise from the combined digital signal.

10. The portable system of claim 9, wherein the particular amplitude threshold is about 125 dB.

11. The portable system of claim 9, wherein the particular duration threshold is about 40 ms to about 70 ms.

12. The portable system of claim 9, wherein the second output excludes recoverable speech content.

13. The portable system of claim 1, further comprising:
a communications interface, operably coupled to the processor, to transmit the representation of the combined digital signal over a network to an electronic device.

14. A method of continuously recording sound pressure due to both continuous noise and impulse noise in an environment, the method comprising:

(A) producing, with a first microphone, a first analog signal representative of impulse noise sound pressure in a first amplitude range from about 100 dB to about 180 dB;

(B) producing, with a second microphone, a second analog signal representative of continuous noise sound pressure in a second amplitude range from about 20 dB to about 140 dB, the second amplitude range being different from first amplitude range;

(C) sampling, with at least one analog-to-digital converter (ADC):

(i) the first analog signal at a first sampling rate equal to or greater than twice the reciprocal of a minimum impulse noise rise time in the first analog signal, thereby generating a first digital signal; and (ii) the second analog signal at a second sampling rate equal to or greater than twice the reciprocal of a minimum impulse noise rise time in the second analog signal, thereby generating a second digital signal;

(D) combining the first digital signal and the second digital signal into a combined digital signal having a combined amplitude range, the combined amplitude range being larger than the first amplitude range, larger than the second amplitude range, and less than or about equal to the sum of the first amplitude range and the second amplitude range, the combined digital signal representing both the continuous noise and the impulse noise in the environment; and (E) storing a representation of the combined digital signal in a nonvolatile memory.

15. The method of claim 14, wherein (A) comprises at least one of:
wearing at least one of the first microphone and the second microphone on at least one of an article of clothing, a headgear, a web gear, and a bag in the environment; and
mounting at least one of the first microphone and the second microphone to at least one of a portable device, a vehicle, and a fixture in the environment.

16. The method of claim 14, wherein:
the first amplitude range is from about 115 dB to about 180 dB;
the second amplitude range is from about 75 dB to about 140 dB; and
the combined amplitude range is less than about 105 dB.

17. The method of claim 14, wherein (C) further comprises:
attenuating the first analog signal to produce an attenuated analog signal for sampling with the at least one ADC to generate the first digital signal; and
amplifying the second analog signal to produce an amplified analog signal for sampling with the at least one ADC to generate the second digital signal.

18. The method of claim 14, wherein the sampling rate is about 20 kHz to about 200 kHz.

19. The method of claim 14, further comprising:
removing from the combined digital signal any samples having an amplitude less than a particular amplitude threshold and any samples having a duration exceeding a particular duration threshold; and
storing the remaining samples of the combined digital signal in the nonvolatile memory as a first output representing at least impulse noise from the combined digital signal.

20. The method of claim 19, wherein:
the particular amplitude threshold is about 125 dB; and
the particular duration threshold is about 40 ms to about 70 ms.

21. The method of claim 19, wherein the first output excludes recoverable speech content.

22. The method of claim 14, further comprising:
identifying at least one output representing at least one type of noise from the combined digital signal.

23. The method of claim 14, further comprising:
dividing the combined digital signal into a plurality of time-frequency bins;
estimating an amount of energy in each time-frequency bin in the plurality of time-frequency bins to produce a plurality of energy estimates; and
storing the plurality of energy estimates in the nonvolatile memory as a second output representing at least continuous background noise from the combined digital signal.

24. The method of claim 23, wherein the plurality of time-frequency bins are selected using a frequency spacing, the frequency spacing being at least one of logarithmic, linear, octave, and fractional octave.

25. The method of claim 23, wherein the plurality of time-frequency bins are selected using a time interval of about 200 ms.

26. The method of claim 14, further comprising:
transmitting the representation of the combined digital signal over a network to an electronic device.

27. A method of recording continuous noise and impulse noise while maintaining confidentiality of speech content in an environment, the method comprising:
attenuating a first analog signal, from a first microphone, representative of impulse noise sound pressure in a first amplitude range selected from about 100 dB to about 180 dB to capture at least some of the impulse noise;
amplifying a second analog signal, from a second microphone, representative of continuous noise sound pressure in a second amplitude range selected from about 20 dB to about 140 dB to capture at least some of the continuous noise, the second amplitude range being different from the first amplitude range;
generating, with at least one analog-to-digital converter (ADC), a first digital signal of the attenuated analog signal at a sampling rate equal to or greater than twice the reciprocal of a minimum impulse noise rise time in the attenuated analog signal and a second digital signal of the amplified analog signal at a sampling rate equal to or greater than twice the reciprocal of a minimum impulse noise rise time in the amplified analog signal;
combining the first digital signal and the second digital signal into a combined digital signal having a combined amplitude range less than or about equal to the sum of the first amplitude range and the second amplitude range, the combined digital signal representing both the continuous noise and the impulse noise in the environment;
generating a first output comprising a plurality of energy estimates by dividing the combined digital signal into a plurality of time-frequency bins and estimating an amount of energy in each time-frequency bin in the plurality of time-frequency bins to produce the plurality of energy estimates, the plurality of energy estimates being downsampled in time and frequency to represent the continuous noise with blurred speech content;
generating a second output representing the impulse noise with removed speech content by removing from the combined digital signal any samples having at least one of an amplitude below about 125 dB and a duration above about 40 ms; and
storing a representation of the first output and the second output in a nonvolatile memory.

28. The method of claim 27, wherein dividing the combined digital signal into the plurality of time-frequency bins and estimating the amount of energy in each time-frequency bin in the plurality of time-frequency bins comprises:
calculating an amount of energy in each frequency band of a plurality of frequency bands to produce a plurality of energy calculations; and
sampling each of the plurality of energy calculations over a time interval to produce the plurality of energy estimates.

29. The method of claim 28, wherein:
the plurality of frequency bands comprises about 32 logarithmically-spaced frequency bands; and
the time interval is about 200 ms.

30. The method of claim 27, wherein the stored representation of the first output and the second output is a reconstructed signal comprising the continuous noise and the impulse noise with blurred speech content.

31. A system for recording continuous noise and impulse noise while maintaining confidentiality of speech content in an environment, the system comprising:
an attenuator, operably coupled to an output of a first microphone, to attenuate a first analog signal, from the first microphone, the first analog signal representative of impulse noise sound pressure in a first amplitude range selected from about 100 dB to about 180 dB to capture at least some of the impulse noise;
an amplifier, operably coupled to an output of a second microphone, to amplify a second analog signal, from the second microphone, the second analog signal representative of continuous noise sound pressure in a second amplitude range selected from about 20 dB to about 140 dB to capture at least some of the continuous noise, the second amplitude range being different from the first amplitude range;
at least one analog-to-digital converter (ADC), operably coupled to the attenuator and the amplifier to generate a first digital signal of the attenuated analog signal at a sampling rate equal to or greater than twice the reciprocal of a minimum impulse noise rise time in the attenuated analog signal and a second digital signal of the amplified analog signal at a sampling rate equal to or greater than twice the reciprocal of a minimum impulse noise rise time in the amplified analog signal;
a combining node, operably coupled to the at least one ADC, to combine the first digital signal and the second digital signal into a combined digital signal having a combined amplitude range less than or about equal to the sum of the first amplitude range and the second amplitude range, the combined digital signal representing both the continuous noise and the impulse noise in the environment; and
at least one processor, operably coupled to the combining node, to:
generate a first output comprising a plurality of energy estimates by dividing the combined digital signal into a plurality of time-frequency bins and estimating an amount of energy in each time-frequency bin in the plurality of time-frequency bins to produce the plurality of energy estimates, the plurality of energy estimates being downsampled in time and frequency to represent the continuous noise with blurred speech content;
generate a second output representing the impulse noise with removed speech content by removing from the combined digital signal any samples having at least one of an amplitude below about 125 dB and a duration above about 40 ms; and
store a representation of the first output and the second output in a nonvolatile memory.

32. The system of claim 31, wherein dividing the combined digital signal into the plurality of time-frequency bins and estimating the amount of energy in each time-frequency bin in the plurality of time-frequency bins comprises:
calculating an amount of energy in each frequency band of a plurality of frequency bands to produce a plurality of energy calculations; and
sampling each of the plurality of energy calculations over a time interval to produce the plurality of energy estimates.

33. The method of claim 32, wherein:
the plurality of frequency bands comprises about 32 logarithmically-spaced frequency bands; and
the time interval is about 200 ms.

34. The method of claim 31, wherein the stored representation of the first output and the second output is a reconstructed signal comprising the continuous noise and the impulse noise with blurred speech content.

* * * * *